United States Patent Office 3,394,201
Patented July 23, 1968

3,394,201
SEPARATION OF HIGH PURITY
4-METHYL-1,3-PENTADIENE
Jack J. Adams, Midland, Mich., assignor to The Dow Chemical Company, Midland, Mich., a corporation of Delaware
No Drawing. Filed Nov. 25, 1966, Ser. No. 596,825
4 Claims. (Cl. 260—681.5)

ABSTRACT OF THE DISCLOSURE

Formation of 4-methyl-1,3-pentadiene is usually accompanied by substantial amounts of the cis- and trans-2-methyl-1,3-pentadiene. The crude product is partially resolved by removal of the trans isomer via reaction with maleic anhydride. The remaining diene is then treated to isomerize the cis isomer and again reacted with maleic anhydride. The desired diene was isolated in 99.6% purity.

---

This invention relates to a method for the separation of high purity 4-methyl-1,3-pentadiene from a mixture comprising 4-methyl-1,3-pentadiene and its isomers, trans-2-methyl-1,3-pentadiene and cis-2-methyl-1,3-pentadiene.

The compound 4-methyl-1,3-pentadiene can be polymerized to form elastomeric products suitable for a variety of uses. For example, the polymer can be formed into sheets, rods, tubing or used as a coating material in the manufacture of raincoats, garment bags or as electrical insulation.

Several methods are known for the preparation of methylpentadienes, including the following: the dehydration of vinyl carbinols; the dehydration of the oxidation products of propylene dimer; the dehydrogenation of propylene dimer; and the dehydration of diacetone glycol such as taught in British Patent 572,602. Such preparation methods usually result in a crude product comprised of a mixture of the isomers trans-2-methyl-1,3-pentadiene, cis-2-methyl-1,3-pentadiene and 4-methyl-1,3-pentadiene. The crude methylpentadienes usually contain from 15 to 25 percent of the 4-methyl-1,3-pentadiene isomer.

The industrial use of 4-methyl-1,3-pentadiene has been restricted because of the difficulty in separating said compound from the chief contaminant, trans-2-methyl-1,3-pentadiene, in the crude product. Distillation is not a practical method for obtaining pure 4-methyl-1,3-pentadiene, because of the closeness of the boiling points of the isomers. U.S. Patent 2,564,405 teaches a method for separating 4-methyl-1,3-pentadiene by treating the crude mixture with an alpha, beta-unsaturated aldehyde to react with the cis and trans isomers and obtain the 4-methyl-1,3-pentadiene as a pure product. Bachman and Goebel, Journal of The American Chemical Society 64, 787 (1942), teach a method for removing unwanted isomer by carrying out a Diels Alder reaction with maleic anhydride. However, both such purification methods essentially remove only the trans isomer while the cis-2-methyl-1,3-pentadiene isomer remains in admixture with the 4-methyl-1,3-pentadiene isomer.

It is a primary object of the invention to provide a new and improved method for separating high purity 4-methyl-1,3-pentadiene from a mixture comprising 4-methyl-1,3-pentadiene and its isomers, trans-2-methyl-1,3-pentadiene and cis-2-methyl-1,3-pentadiene. It is a further object to provide a method for the separation of 4-methyl-1,3-pentadiene from both the trans- and cis-2-methyl-1,3-pentadiene isomers which results in a product of greater purity than has been possible by the heretofore known methods.

The foregoing and additional objects and cognate advantages and benefits are obtained by: first treating the mixture containing the 4-methyl-1,3-pentadiene and its isomers, trans- and cis-2-methyl-1,3-pentadiene, with maleic anhydride so as to effect a preferential combination of the trans-2-methyl-1,3-pentadiene; then separating from the resulting mixture the unreacted 4-methyl-1,3-pentadiene and cis-2-methyl-1,3-pentadiene isomers; thereafter treating the mixture of unreacted isomers with from about 0.1 to about 2.0 percent by weight of iodine, bromine, or aluminum triiodide at a temperature of from about room temperature to about 50° C. so as to isomerize the cis-2-methyl-1,3-pentadiene to the trans isomer; then treating the mixture again with maleic anhydride so as to effect a preferential combination of the trans-2-methyl-1,3-pentadiene; and subsequently separating from the resulting mixture the unreacted 4-methyl-1,3-pentadiene as a product of high purity, e.g. at least 99 percent purity.

Any crude reaction product or hydrocarbon mixture containing the 4-methyl-1,3-pentadiene and its isomers, trans-2-methyl-1,3-pentadiene and cis-2-methyl-1,3-pentadiene can be utilized in the method of the invention as the source of the methylpentadienes. For instance, mixtures derived from the dehydration of diacetone glycol (2-methyl-2,4-pentanediol) can be utilized as the source of the methylpentadienes. These mixtures usually contain larger amounts of the 2-methyl isomers than the 4-methyl isomer.

The treatment with maleic anhydride to remove the trans-2-methyl-1,3-pentadiene isomer by a Diels-Alder reaction generally involves using a slight molar excess of maleic anhydride over the amount of trans isomer present in the mixture to be purified. A small amount of a polymerization inhibitor such as hydroquinone may be added to the reaction mixture. The Diels-Alder reaction is usually carried out at a temperature between about 0° C. and about 50° C. and preferably between about room temperature and about 40° C., the upper temperature being limited by the necessity to prevent polymerization of the 4-methyl-1,3-pentadiene isomer.

The separation step is usually accomplished by using an azeotropic distillation with water carried out at atmospheric pressure or thereabout and at temperatures of up to about 100° C. An excess of water is used over that necessary to react with the maleic anhydride-trans isomer reaction product. It is important to remove all, or substantially all, of the trans isomer in order to facilitate isomerization of the cis-2-methyl-1,3-pentadiene in a subsequent step in the process.

After removal of the trans isomer-maleic anhydride reaction product, the mixture of the unreacted 4-methyl and cis-2-methyl isomers is treated with from about 0.1 to about 2.0 percent by weight of iodine, bromine, or aluminum triiodide at a temperature of from about room temperature to about 50° C. in order to isomerize the cis-2-methyl-1,3-pentadiene to the trans isomer. The resulting mixture is again treated with maleic anhydide to form the trans isomer-maleic anhydride reaction product. The unreacted 4-methyl-1,3-pentadiene is subsequently separated from this mixture, usually by distillation, and as product of high purity.

The following non-limiting examples serve to illustrate my invention:

Example I

Reactions were carried out at room temperature in a round bottom flask equipped with a magnetic stirrer and reflux condenser. A three foot Vigreux column with a total reflux, partial takeoff condensing head and a three foot platinum wire spiral wound column were used for distillation. Analyses of the various fractions were determined on a F & M Model 700-gas-liquid chromatograph. A 25 foot, 30 percent 3,3'-oxydipropronitrile column was used at 75° C.

A mixture of methylpentadienes was prepared by dehydration of diacetone glycol (2-methyl-2,4-pentanediol) as taught in British Patent 572,602. The following isomers were present in the crude methylpentadiene mixture:

|  | Percent |
|---|---|
| 4-methyl-1,3-pentadiene | 23.0 |
| Trans-2-methyl-1,3-pentadiene | 75.2 |
| Cis-2-methyl-1,3-pentadiene | 1.8 |

Six moles of the crude mixture was reacted with 4.6 moles of maleic anhydride to form the Diels Alder reaction product with the trans-2-methyl-1,3-pentadiene. To prevent polymerization, 0.1 percent by weight of hydroquinone was added to the reaction flask. The maleic anhydride was added gradually to keep the temperature below 50° C. An azeotrope distillation with water—10 moles having been added—was carried out to separate the unreacted isomers, i.e. primarily the 4-methyl and cis-2-methyl isomers, from the resulting mixture, and the following analysis was obtained:

Unreacted isomers from maleic anhydride treated mixture, percent
| 4-methyl-1,3-pentadiene | 94.73 |
|---|---|
| Trans-2-methyl-1,3-pentadiene | 0.13 |
| Cis-2-methyl-1,3-pentadiene | 5.14 |

The mixture containing the unreacted isomers was then treated with one percent by weight of iodine and was allowed to stand at room temperature for six days. The following results were observed:

$I_2$ treated mixture—six days
| Percent 4-methyl-1,3-pentadiene | 94.38 |
|---|---|
| Percent trans-2-methyl-1,3-pentatdiene | 4.67 |
| Percent cis-2-methyl-1,3-pentadiene | 0.95 |

Isomerization of the cis isomer to the trans isomer occurred. The iodine treated mixture of isomers was reacted with sufficient maleic anhydride to form the Diels Alder reaction product with the trans-2-methyl isomer. An azeotrope distillation was then carried out to separate the unreacted isomer. There was obtained 4-methyl-1,3-pentadiene as a product of 99 percent purity.

Example II

Another portion of the crude mixture of methylpentadiene isomers was reacted with maleic anhydride to form the Diels Alder reaction product with trans-2-methyl-1,3-pentadiene employing a procedure similar to that employed in Example I. An azeotrope distillation with water was carried out to separate the unreacted isomers, i.e. primarily the 4-methyl and cis-2-methyl isomers, from the resulting mixture. The mixture containing the unreacted isomers was then treated with one percent iodine and was maintained at a temperature of 50° C. in a constant temperature bath for a time as stated below. The following results were observed:

|  | Unreacted isomer mixture | $I_2$ treated mixture 2 hours | $I_2$ treated mixture 5 hours |
|---|---|---|---|
| Percent 4-methyl-1,3-pentadiene | 94.99 | 95.19 | 95.31 |
| Percent trans-2-methyl-1,3-pentadiene | 0.18 | 4.33 | 4.53 |
| Percent cis-2-methyl-1,3-pentadiene | 4.83 | 0.48 | 0.16 |

Isomerization of the cis-2-methyl-1,3-pentadiene to the trans isomer took place much more rapidly at 50° C. The iodine treated mixture was reacted with sufficient maleic anhydride again to remove the trans-2-methyl-1,3-pentadiene. Water was added and an axeotrope distillation was then carried out to separate the following high purity unreacted product having the composition:

|  | Percent |
|---|---|
| 4-methyl-1,3-pentadiene | 99.60 |
| Trans-2-methyl-1,3-pentadiene | 0.08 |
| Cis-2-methyl-1,3-pentadiene | 0.32 |

A further increase in the purity of the desired 4-methyl isomer would result if this product was re-treated.

Example III

Six moles of crude methyl pentadienes containing 77.8 percent trans-2-methyl-1,3-pentadiene, 0.8 percent cis-2-methyl-1,3-pentadiene, and 21.4 percent 4-methyl-1,3-pentadiene was reacted with 4.68 moles of maleic anhydride to form the Diels-Aldler reaction product. The methyl pentadiene mixture was added to the reaction flask and 0.1 percent by weight of hydroquinone was added to prevent polymerization. The maleic anhydride was added gradually to keep the temperature below 50° C. When the reaction was complete, 10 moles of water was added and an azeotrope distillation was carried out to separate the unreacted isomers. The distillate had the following anlysis:

| Percent 4-methyl-1,3-pentadiene | 95.43 |
|---|---|
| Percent trans-2-methyl-1,3-pentadiene | 0.06 |
| Percent cis-2-methyl-1,3-pentadiene | 4.51 |

100 grams of product was treated with one percent by weight of aluminum triiodide at room temperature for seven days. The following results were observed:

$AlI_3$ treated mixture— seven days
| Percent 4-methyl-1,3-pentadiene | 95.75 |
|---|---|
| Percent trans-2-methyl-3,3-pentadiene | 4.03 |
| Percent cis-2-methyl-1,3-pentadiene | 0.22 |

The trans isomer is removed by treatment with maleic anhydride, and high purity 4-methyl-1,3-pentadiene is separated from the resulting mixture by azeotropic distillation.

I claim:

1. A method for the separation of high purity 4-methyl-1,3-pentadiene from a mixture comprising 4-methyl-1,3-pentadiene, cis - 2 - methyl-1,3-pentadiene and trans-2-methyl-1,3-pentadiene which method comprises the sequential steps of (a) treating the mixture with maleic anhydride to remove the trans isomer, (b) separating from the resulting mixture the unreacted isomers, (c) treating the mixture of unreacted isomers with from about 0.1 to about 2.0 percent by weight of a catalyst selected from the group consisting of iodine, bromine, and aluminum triiodide at a temperature of from about room temperature to about 50° C. to isomerize the cis isomer to the trans isomer, (d) treating the isomerized mixture with maleic anhydride to remove the trans isomer, and (e) separating from the resulting mixture the unreacted 4-methyl-1,3-pentadiene in substantially pure form.

2. The method as claimed in claim 1, wherein the separation steps are carried out by an azeotropic distillation with water.

3. In a method for the separation of high purity 4-methyl-1,3-pentadiene from a mixture consisting essentially of 4-methyl-1,3,pentadiene and cis-2-methyl-1,3-pentadiene, the steps which consist in treating the mixture with from about 0.1 to about 2.0 percent by weight of a catalyst selected from the group consisting of iodine, bromine, and aluminum triiodide at a temperature of from about room temperature to about 50° C. to isomerize the cis isomer to the trans isomer, then treating the isomerized mixture with maleic anhydride to remove the trans isomer, and subsequently separating from the resulting mixture the unreacted 4-methyl-1,3-pentadiene in substantially pure form.

4. The method as claimed in claim 3, wherein the separation step is carried out by an azeotropic distillation with water.

References Cited

UNITED STATES PATENTS 2,564,405   8/1951   Morris et al. _____ 260—681.5

OTHER REFERENCES

Bachman & Goebel: "The Prep. and Isolation of 4-Methyl-1,3-pentadiene," J. Am. Chem. Soc. 64 787–90 (1942).

DELBERT E. GANTZ, *Primary Examiner.*

G. E. SCHMITKONS, *Assistant Examiner.*